(12) United States Patent
Mars et al.

(10) Patent No.: US 11,010,656 B2
(45) Date of Patent: May 18, 2021

(54) SYSTEM AND METHOD FOR IMPLEMENTING AN ARTIFICIALLY INTELLIGENT VIRTUAL ASSISTANT USING MACHINE LEARNING

(71) Applicant: Clinc, Inc., Ann Arbor, MI (US)

(72) Inventors: Jason Mars, Ann Arbor, MI (US);
Lingjia Tang, Ann Arbor, MI (US);
Michael Laurenzano, Ann Arbor, MI (US); Johann Hauswald, Ann Arbor, MI (US)

(73) Assignee: Clinc, Inc., Ann Arbor, MI (US)

( * ) Notice: Subject to any disclaimer, the term of this patent is extended or adjusted under 35 U.S.C. 154(b) by 0 days.

(21) Appl. No.: 15/797,414

(22) Filed: Oct. 30, 2017

(65) Prior Publication Data

US 2019/0130244 A1    May 2, 2019

(51) Int. Cl.
*G06N 3/00* (2006.01)
*G06N 3/08* (2006.01)
(Continued)

(52) U.S. Cl.
CPC ........... *G06N 3/006* (2013.01); *G06N 3/08* (2013.01); *G06N 20/00* (2019.01); *G10L 15/18* (2013.01); *G10L 15/22* (2013.01)

(58) Field of Classification Search
CPC ........ G06N 3/006; G06N 99/005; G06N 3/08; G06N 20/00; G10L 15/18; G10L 15/22
See application file for complete search history.

(56) References Cited

U.S. PATENT DOCUMENTS 4,516,201 A * 5/1985 Warren ............... G06F 13/38
709/234
5,371,807 A * 12/1994 Register ............... G06F 17/274
382/159

(Continued)

FOREIGN PATENT DOCUMENTS

WO    2015192239 A1    12/2015
WO    2017184587 A1    10/2017

OTHER PUBLICATIONS

Har-Peled, Sariel, Dan Roth, and Dav Zimak. "Constraint Classification for Multiclass Classification and Ranking" 2003 [Online] Downloaded Sep. 23, 2019 http://papers.nips.cc/paper/2295-constraint-classification-for-multiclass-classification-and-ranking.pdf (Year: 2003).*

(Continued)

*Primary Examiner* — Ben M Rifkin
(74) *Attorney, Agent, or Firm* — Alee PLLC; Padowithz Alce

(57) ABSTRACT

Systems and methods for implementing an artificially intelligent virtual assistant includes collecting a user query; using a competency classification machine learning model to generate a competency label for the user query; using a slot identification machine learning model to segment the text of the query and label each of the slots of the query; generating a slot value for each of the slots of the query; generating a handler for each of the slot values; and using the slot values to: identify an external data source relevant to the user query, fetch user data from the external data source, and apply one or more operations to the query to generate response data; and using the response data, to generate a response to the user query.

11 Claims, 8 Drawing Sheets

(51) Int. Cl.
*G06N 20/00* (2019.01)
*G10L 15/22* (2006.01)
*G10L 15/18* (2013.01)

(56) References Cited

U.S. PATENT DOCUMENTS

| | | | |
|---|---|---|---|
| 5,727,950 | A | 3/1998 | Cook et al. |
| 6,374,226 | B1* | 4/2002 | Hunt .................. G10L 15/26 704/255 |
| 6,455,991 | B2 | 9/2002 | Tsuji |
| 6,456,991 | B1 | 9/2002 | Srinivasa et al. |
| 7,769,705 | B1 | 8/2010 | Luechtefeld |
| 7,792,353 | B2 | 9/2010 | Forman et al. |
| 8,069,131 | B1 | 11/2011 | Luechtefeld et al. |
| 8,090,085 | B2 | 1/2012 | Di et al. |
| 8,140,450 | B2 | 3/2012 | Porikli et al. |
| 8,738,365 | B2 | 5/2014 | Ferrucci et al. |
| 8,825,533 | B2 | 9/2014 | Basson et al. |
| 8,898,098 | B1 | 11/2014 | Luechtefeld |
| 8,934,619 | B2 | 1/2015 | Di Fabbrizio et al. |
| 9,112,976 | B2 | 8/2015 | Phelps et al. |
| 9,189,742 | B2 | 11/2015 | London |
| 9,489,625 | B2 | 11/2016 | Kalns et al. |
| 9,552,549 | B1 | 1/2017 | Gong et al. |
| 9,862,245 | B2 | 1/2018 | Kim |
| 9,886,953 | B2 | 2/2018 | Lemay et al. |
| 2002/0083068 | A1* | 6/2002 | Quass .................. G06F 17/243 |
| 2002/0196679 | A1* | 12/2002 | Lavi .................. G06F 40/30 365/200 |
| 2004/0128624 | A1 | 7/2004 | Arellano et al. |
| 2006/0166174 | A1 | 7/2006 | Rowe et al. |
| 2007/0038609 | A1 | 2/2007 | Wu |
| 2007/0185896 | A1 | 8/2007 | Jagannath et al. |
| 2009/0030800 | A1 | 1/2009 | Grois |
| 2009/0204386 | A1 | 8/2009 | Seligman et al. |
| 2010/0121808 | A1 | 5/2010 | Kuhn |
| 2011/0125734 | A1 | 5/2011 | Duboue et al. |
| 2011/0231182 | A1 | 9/2011 | Weider et al. |
| 2013/0031476 | A1* | 1/2013 | Coin .................. G06F 17/2881 715/706 |
| 2013/0185074 | A1 | 7/2013 | Gruber et al. |
| 2013/0288222 | A1 | 10/2013 | Stacy et al. |
| 2014/0108308 | A1* | 4/2014 | Stout .................. G06N 3/08 706/12 |
| 2014/0337266 | A1 | 11/2014 | Kalns et al. |
| 2015/0286955 | A1 | 10/2015 | Virkar et al. |
| 2015/0310858 | A1 | 10/2015 | Li et al. |
| 2015/0339590 | A1 | 11/2015 | Maarek et al. |
| 2015/0382047 | A1 | 12/2015 | Van Os et al. |
| 2016/0019469 | A1 | 1/2016 | Petrov |
| 2016/0026634 | A1 | 1/2016 | Allen et al. |
| 2016/0048772 | A1 | 2/2016 | Bruno et al. |
| 2016/0063389 | A1 | 3/2016 | Fuchs et al. |
| 2016/0070992 | A1 | 3/2016 | Fujii |
| 2016/0260436 | A1 | 9/2016 | Lemay et al. |
| 2017/0124487 | A1 | 5/2017 | Szeto et al. |
| 2017/0160813 | A1 | 6/2017 | Divakaran et al. |
| 2017/0206152 | A1 | 7/2017 | Kochura et al. |
| 2017/0300831 | A1 | 10/2017 | Gelfenbeyn et al. |
| 2018/0047388 | A1 | 2/2018 | Tyagi et al. |
| 2018/0225373 | A1 | 8/2018 | Alba et al. |
| 2018/0365212 | A1 | 12/2018 | Banerjee et al. |
| 2019/0235831 | A1 | 8/2019 | Bao |

OTHER PUBLICATIONS

Tur, Gokhan et al. "What Is Left To Be Undertood in ATIS" IEEE 2010, [Online] Downloaded Apr. 5, 2021 https://ieeexplore.ieee.org/stamp/stamp.jsp?tp=&arnumber=5700816 (Year: 2010).*

Guo, Daniel et al. "Joint Semantic Utterance Classification and Slot Filling with Recursive Neural Networks" IEEE 2014 [Online] Downloaded Apr. 5, 2021 https://ieeexplore.ieee.org/stamp/stamp.jsp?tp=&arnumber=7078634 (Year: 2014).*

Ward, Wayne and Sunil Issar. "Recent Improvements In the CMU Spoken Language Understanding System" 1994 [Online] Downloaded Apr. 5, 2021 https://www.aclweb.org/anthology/H94-1039.pdf (Year: 1994).*

Huang, Xuedong et al. "An Overview of the Sphinx-II Speech Recognition System" 1993 [Online] Downloaded Apr. 5, 2021 https://www.aclweb.org/anthology/H94-1039.pdf (Year: 1993).*

Cao et al., "Context-Aware Query Classification", ACM SIGIR'09, Jul. 19-23, 2009.

Deng, L., & Platt, J.C. (2014). Ensemble deep learning for speech recognition. In Fifteenth Annual Conference of the International Speech Communication Association. (Year: 2014).

International Search Report and Written Opinion for PCT Application No. PCT/US17/58995 dated Feb. 1, 2018.

International Search Report and Written Opinion for PCT Application No. PCT/US17/63034 dated Feb. 12, 2018.

International Search Report and Written Opinion for PCT Application No. PCT/US18/20857 dated Apr. 24, 2018.

John, G. H., Kohavi, R., & Pfleger, K. (1994). Irrelevant features and the subset selection problem. In Machine Learning Proceedings 1994 (pp. 121-129). (Year: 1994).

Kinnunen, T., Karpov, E., & Franti, P. (2006). Real-time speaker identification and verification. IEEE Transactions on Audio, Speech and Language Processing, 14(1), 277-288. (Year: 2006).

Zhang, X. L., & Wang, D. (2016). Boosting contextual information for deep neural network based voice activity detection. IEEE/ACM Transactions on Audio, Speech and Language Processing (TASLP), 24(2), 252-264. (Year: 2016).

Zhang, X. L., & Wu, J. (2013). Deep belief networks based voice activity detection. IEEE Transactions on Audio, Speech, and Language Processing, 21(4), 697-710. (Year: 2013).

Lin, Shih-Wei , et al., "Particle swarm optimization for parameter determination and feature selection of support vector machines. ScienceDirect, Expert Systems with Applications 35 (2008) 1817-1824".

Graesser, Arthur C., et al., "AutoTutor: A tutor with dialogue in natural language", Behavior Research Methods, Instruments & Computers 2004, 36 (2), pp. 180-192.

Graesser, Arthur C., et al., "Intelligent Tutoring Systems with Conversational Dialogue", AI Magazine vol. 22, No. 4 (2001) (© AAAI), pp. 39-52.

Litman, Diane J., et al., "ITSPOKE: An Intelligent Tutoring Spoken Dialogue System", HLT NAACL—Demonstrations 04 Demonstration Papers at HTL-NAACL, pp. 5-8, May 2-7, 2004.

Sakagami, Y. , et al., "The intelligent ASIMO: System overview and integration", IEEE/RSJ International Conference on Intelligent Robots and Systems Sep. 30-Oct. 4, 2002, pp. 2478-2483.

Azarbonyad, Hosein , et al., "Hierarchical Re-estimation of Topic Models for Measuring Topical Diversity", arXiv, pp. 1-12, Jan. 16, 2017.

Williams, Adina , et al., "A Broad-Coverage Challenge Corpus for Sentence Understanding through Inference", arXiv, pp. 1-11, Feb. 19, 2018.

Serban, Julian V., et al., "A Deep Reinforcement Learning Chatbot", Montreal Institute for Learning Algorithms, Montreal, Quebec, Canada, arXiv preprint arXiv: 1709.02349, Nov. 5, 2017.

* cited by examiner

SYSTEM AND METHOD FOR IMPLEMENTING AN ARTIFICIALLY INTELLIGENT VIRTUAL ASSISTANT USING MACHINE LEARNING

GOVERNMENT RIGHTS

The subject matter of the invention may be subject to U.S. Government Rights under National Science Foundation grant: NSF SBIR Phase 1 Grant—1622049.

TECHNICAL FIELD

The inventions herein relate generally to the virtual assistant field, and more specifically to a new and useful system and method for implementing an artificially intelligent assistant using machine learning in the virtual assistant field.

BACKGROUND

Modern virtual assistants and/or online chatbots may typically be employed to perform various tasks or services based on an interaction with a user. Typically, a user interacting with a virtual assistant may pose a question or otherwise submit a command to the virtual assistant to which the virtual assistant may provide a response or a result. Many of these virtual assistants may be implemented using a rules-based approach, which typically requires coding or preprogramming many or hundreds of rules that may govern a manner in which the virtual assistant should operate to respond to a given query or command from a user.

While the rules-based approach for implementing a virtual assistant may be useful for addressing pointed or specific queries or commands made by a user, the rigid or finite nature of this approach severely limits a capability of a virtual assistant to address queries or commands from a user that exceed the scope of the finite realm of pointed and/or specific queries or commands that are addressable by the finite set of rules that drive the response operations of the virtual assistant.

That is, the modern virtual assistants implemented via a rules-based approach for generating responses to users may not fully satisfy queries and commands posed by a user for which there are no predetermined rules to provide a meaningful response or result to the user.

Therefore, there is a need in the virtual assistant field for a flexible virtual assistant solution that is capable of evolving beyond a finite set of rules for effectively and conversantly interacting with a user. The embodiments of the present application described herein provide technical solutions that address, at least, the need described above, as well as the deficiencies of the state of the art described throughout the present application.

DESCRIPTION OF THE PREFERRED EMBODIMENTS

The following description of the preferred embodiments of the present application are not intended to limit the inventions to these preferred embodiments, but rather to enable any person skilled in the art to make and use these inventions.

Overview

As discussed above, existing virtual assistant implementations do not have the requisite flexibility to address unrecognized queries or commands from user in which there are no predetermined rules designed around narrowly-defined intents. This inflexible structure cannot reasonably and efficiently address the many variances in the manners in which a user may pose a query or command to the virtual assistant.

The embodiments of the present application, however, provide artificial intelligence virtual assistant platform and natural language processing capabilities that function to process and comprehend structured and/or unstructured natural language input from a user. Using one or more trained (deep) machine learning models, such as long short-term memory (LSTM) neural network, the embodiments of the present application may function to understand any variety of natural language utterance or textual input provided to the system. The one or more deep machine learning models post deployment can continue to train using unknown and previously incomprehensible queries or commands from users. As a result, the underlying system that implements the (deep) machine learning models may function to evolve with increasing interactions with users and training rather than being governed by a fixed set of predetermined rules for responding to narrowly-defined queries, as may be accomplished in the current state of the art.

Accordingly, the evolving nature of the artificial intelligence platform described herein therefore enables the artificially intelligent virtual assistant latitude to learn without a need for additional programming and the capabilities to ingest complex (or uncontemplated) utterances and text input to provide meaningful and accurate responses.

1. System for Implementing an Artificially Intelligent Virtual Assistant

Figure 1:
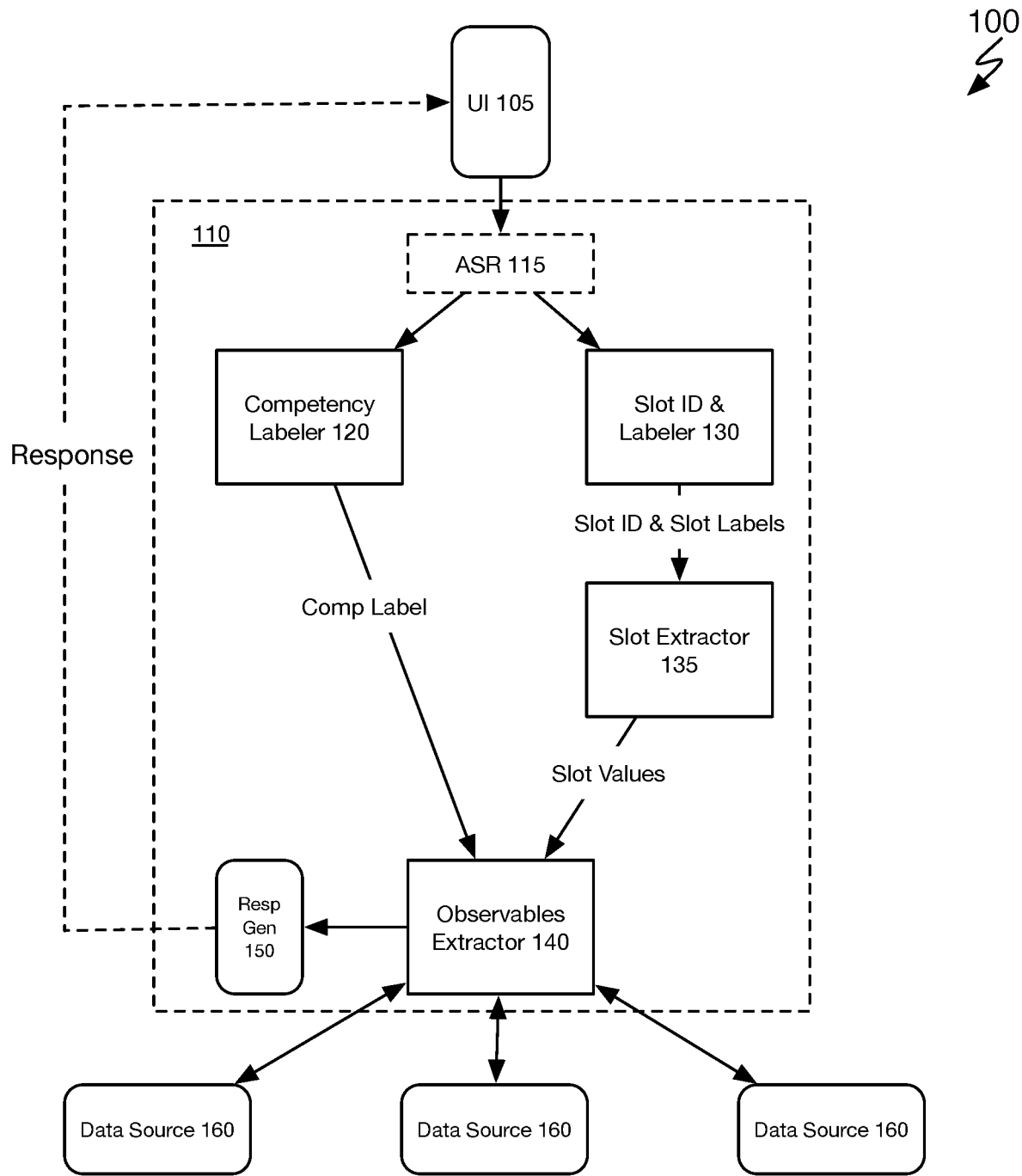
FIG. 1 illustrates a schematic representation of a system in accordance with one or more embodiments of the present application.

As shown in FIG. 1, a system 100 that implements an artificially intelligent virtual assistant includes an artificial intelligence (AI) virtual assistant platform 110 that includes a competency classification engine 120, a slot identification engine 130, a slot value extractor 135, an observables extractor 140, an artificial intelligence virtual assistant response generator 150, and data sources 160. The system 100 may additionally include an automatic speech recognition unit 115 and a user interface system 105.

The system 100 functions to implement the artificial intelligence virtual assistant platform 110 to enable intelligent and conversational responses by an artificially intelligent virtual assistant to a user query and/or user command input into the system 100. Specifically, the system 100 functions to ingest user input in the form of text or speech into a user interface 160. At natural language processing components of the system 100 that may include, at least, the competency classification engine 120 the slot identification engine 130, and a slot value extractor 135, the system 100 functions to identify a competency classification label for the user input data and parse the user input data into comprehensible slots or segments that may, in turn, be converted into program-comprehensible and/or useable features. Leveraging the outputs of the natural language processing components of the system 100, the observables extractor 140 may function to generate handlers based on the outcomes of the natural language processing components and further, execute the generated handlers to thereby perform various operations that accesses one or more data sources relevant to the query or command and that also performs one or more operations (e.g., data filtering, data aggregation, and the like) to the data accessed from the one or more data sources.

The artificial intelligence virtual assistant platform 110 functions to implement an artificially intelligent virtual assistant capable of interacting and communication with a user. The artificial intelligence platform no may be implemented via one or more specifically configured web or private computing servers (or a distributed computing system; e.g., the cloud) or any suitable system for implementing the system 100 and/or the method 200.

In some implementations, the artificial intelligence virtual assistant platform 110 may be a remote platform implemented over the web (e.g., using web servers) that is configured to interact with distinct and disparate service providers. In such implementation, an event such as a user attempting to access one or more services or data from one or more data sources of the service provider may trigger an implementation of the artificially intelligent virtual assistant of the AI platform 110. Thus, the AI virtual assistant platform 110 may work in conjunction with the service provider to attend to the one or more queries and/or commands of the users of the service provider. In this implementation, the data sources 160 may be data sources of the service provider that are external data sources to the AI virtual assistant platform 110.

The competency classification engine 120 together with the slot identification engine 130 and the slot value extractor 135 preferably function to define a natural language processing (NLP) component of the artificial intelligence platform 110. In one implementation, the natural language processing component may additionally include the automatic speech recognition unit 105.

The competency classification engine 120 functions to implement one or more competency classification machine learning models to label user input data comprising a user query or a user command. The one or more competency classification machine learning models may include one or more deep machine learning algorithms (e.g., a recurrent neural network, etc.) that have been specifically trained to identify and/or classify a competency label for utterance input and/or textual input. The training input used in training the one or more deep machine learning algorithms of the competency classification engine 120 may include crowd-sourced data obtained from one or more disparate user query or user command data sources and/or platforms (e.g., messaging platforms, etc.). However, it shall be noted that the system 100 may obtain training data from any suitable external data sources. The one or more deep machine learning algorithms may additionally be continually trained using user queries and user commands that were miss-predicted or incorrectly analyzed by the system 100 including the competency classification engine 120.

The competency classification engine 120 may additionally be configured to generate or identify one competency classification label for each user query and/or user command input into the engine 120. The competency classification engine 120 may be configured to identify or select from a plurality of predetermined competency classification labels (e.g., Income, Balance, Spending, Investment, Location, etc.). Each competency classification label available to the competency classification engine 120 may define a universe of competency-specific functions available to the system 100 or the artificially intelligent assistant for handling a user query or user command. That is, once a competency classification label is identified for a user query or user command, the system 100 may use the competency classification label to restrict one or more computer-executable operations (e.g., handlers) and/or filters that may be used by system components when generating a response to the user query or user command. The one or more computer-executable operations and/or filters associated with each of the plurality of competency classifications may be different and distinct and thus, may be used to process user queries and/or user commands differently as well as used to process user data (e.g., transaction data obtained from external data sources 160).

Additionally, the competency classification machine learning model 120 may function to implement a single deep machine learning algorithm that has been trained to identify multiple competency classification labels. Alternatively, the competency classification machine learning model 120 may function to implement an ensemble of deep machine learning algorithms in which each deep machine learning algorithm of the ensemble functions to identify a single competency classification label for user input data. For example, if the competency classification model 120 is capable of identifying three distinct competency classification labels, such as Income, Balance, and Spending, then the ensemble of deep machine learning algorithms may include three distinct deep machine learning algorithms that classify user input data as Income, Balance, and Spending, respectively. While each of the deep machine learning algorithms that define the ensemble may individually be configure to identify a specific competency classification label, the combination of deep machine learning algorithms may additionally be configured to work together to generate individual competency classification labels. For example, if the system receives user input data that is determined to be highly complex (e.g., based on a value or computation of the user input data exceeding a complexity threshold), the system 100 may function to selectively implement a subset (e.g., three ML algorithms from a total of nine ML algorithms or the like) of the ensemble of machine learning algorithms to generate a competency classification label.

Additionally, the competency classification engine 120 may be implemented by the one or more computing servers, computer processors, and the like of the artificial intelligence virtual assistance platform 110.

The slot identification engine 130 functions to implement one or more machine learning models to identify slots or meaningful segments of user queries or user commands and also, to assign a slot classification label for each identified slot. The one or more machine learning models implemented by the slot identification engine 130 may implement one or more trained deep machine learning algorithms (e.g., recurrent neural networks). The one or more deep machine learning algorithms of the slot identification engine 130 may be trained in any suitable manner including with sample data of user queries and user commands that have been slotted and assigned slot values and/or user system derived examples. Alternatively, the slot identification engine 130 may function to implement an ensemble of deep machine learning algorithms in which each deep machine learning algorithm of the ensemble functions to identify distinct slot labels or slot type labels for user input data. For example, slot identification engine 130 may be capable of identifying multiple distinct slot classification labels, such as Income, Account, and Date labels, then the ensemble of deep machine learning algorithms may include three distinct deep machine learning algorithms that function to classify segments or tokens of the user input data as Income, Account, and Date, respectively.

A slot, as referred to herein, generally relates to a defined segment of user input data (e.g., user query or user command) that may include one or more data elements (e.g., terms, values, characters, media, etc.). Accordingly, the slot identification engine 130 may function to decompose a query or command into defined, essential components that implicate meaningful information to be used when generating a response to the user query or command.

A slot label which may also be referred to herein as a slot classification label may be generated by the one or more slot classification deep machine learning models of the engine 130. A slot label, as referred to herein, generally relates to one of a plurality of slot labels that generally describes a slot (or the data elements within the slot) of a user query or user command. The slot label may define a universe or set of machine or program-comprehensible objects that may be generated for the data elements within an identified slot.

Like the competency classification engine 120, the slot identification engine 120 may implement a single deep machine learning algorithm or an ensemble of deep machine learning algorithms. Additionally, the slot identification engine 130 may be implemented by the one or more computing servers, computer processors, and the like of the artificial intelligence virtual assistance platform 110.

The machine learning models and/or the ensemble of machine learning models may employ any suitable machine learning including one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial lest squares regression, Sammon mapping, multidimensional scaling, projection pursuit, etc.), an ensemble method (e.g., boosting, boostrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. Further, any suitable model (e.g., machine learning, non-machine learning, etc.) can be used in implementing the artificially intelligent virtual assistant and/or other components of the system 100.

The slot value extraction unit 135 functions to generate slot values by extracting each identified slot and assigned slot label of the user query or user command and converting the data elements (i.e., slot data) within the slot to a machine or program-comprehensible object or instance (e.g., term or value); that is, the slot label is mapped to coding or data that a computer or program of the system 100 comprehends and is able to manipulate or execute processes on. Accordingly, using the slot label generated by the slot identification engine 130, the slot extraction unit 135 identifies a set or group of machine or program-comprehensible objects or instances that may be applied to slot data of a slot assigned with the slot label. Thus, the slot extraction unit 135 may convert the slot data of a slot to a machine or program-comprehensible object (e.g., slot values) based on the slot label and specifically, based on the available objects, instances, or values mapped to or made available under the slot label.

The observables extractor 140 functions to use the slot values comprising the one or more program-comprehensible objects generated at slot extraction unit 135 to determine or generate one or more handlers or subroutines for handling the data of or responding to the user query or user command of user input data. The observables extractor 140 may function to use the slot values provided by the slot extraction unit 135 to determine one or more data sources relevant to and for addressing the user query or the user command and determine one or more filters and functions or operations to apply to data accessed or collected from the one or more identified data sources. Thus, the coding or mapping of the slot data, performed by slot extraction unit 135, to program-comprehensible objects or values may be used to specifically identify the data sources and/or the one or more filters and operations for processing the data collected from the data sources.

The response generator 150 functions to use the competency classification label of the user input data to identify or select one predetermined response template or one of a plurality of predetermined response templates. For each competency classification label of the system 100, the system 100 may have stored a plurality of response templates that may be selected by the response generator 150 based on an identified competency classification label for user input data. Additionally, or alternatively, the response template may be selected based on both the competency classification label and one or more generated slot values. In such instance, the one or more slot values may function to narrow the pool of response template selectable by the response generator to a subset of a larger pool of response templates to take into account the variations in a query or user command identified in the slot values. The response templates may generally a combination of predetermined output language or text and one or more input slots for interleaving the handler outputs determined by the observables extractor 140.

The user interface system 105 may include any type of device or combination of devices capable of receiving user input data and presenting a response to the user input data from the artificially intelligent virtual assistant. In some embodiments, the user interface system 105 receives user input data in the form of a verbal utterance and passes the utterance to the automatic speech recognition unit 115 to convert the utterance into text. The user interface system 105 may include, but are not limited to, mobile computing devices (e.g., mobile phones, tablets, etc.) having a client application of the system 100, desktop computers or laptops implementing a web browser, an automated teller machine, virtual and/or personal assistant devices (e.g., Alexa, Google Home, Cortana, Jarvis, etc.), chatbots or workboats, etc. An intelligent personal assistant device (e.g., Alexa, etc.) may be any type of device capable of touchless interaction with a user to performing one or more tasks or operations including providing data or information and/or controlling one or more other devices (e.g., computers, other user interfaces, etc.). Thus, an intelligent personal assistant may be used by a user to perform any portions of the methods described herein, including the steps and processes of method 200, described below. Additionally, a chatbot or a workbot may include any type of program (e.g., slack bot, etc.) implemented by one or more devices that may be used to interact with a user using any type of input method (e.g., verbally, textually, etc.). The chatbot or workbot may be embedded or otherwise placed in operable communication and/or control of a communication node and thus, capable of performing any process or task including, but not limited to, acquiring and providing information and performing one or more control operations.

2. Method for Implementing an Artificially Intelligent Virtual Assistant

Figure 2:
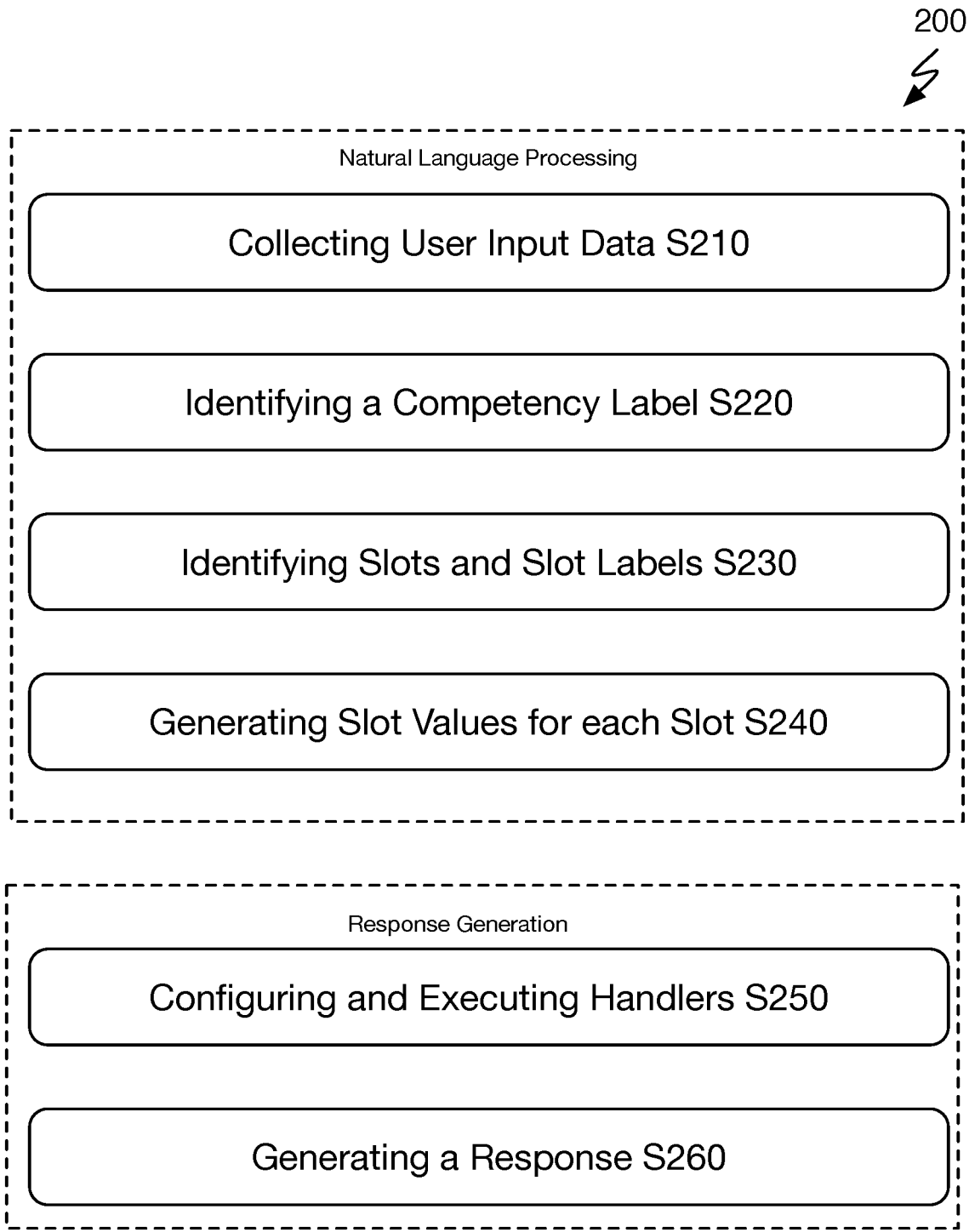
FIG. 2 illustrates an example method in accordance with one or more embodiments of the present application.

As shown in FIG. 2, a method 200 for implementing an artificially intelligent virtual assistant includes collecting user input data S210, identifying a competency classification label based on the user input data S220, identifying one or more slots and slot labels of the user input data S230, generating slot values for each of the slots of the user input data S240, configuring handlers and executing one or more computer-executable operations for generating a response S250, and generating a response S260. The method 200 optionally includes processing and converting utterance data of the user input data to textual data S215.

The method 200 functions to identify a competency of the user input data by using a machine learning model to classify an area of competency of the user input data. The method 200 additionally functions to perform slot value identification of the user input data that includes identifying details in the query or command that enables the system to service the query or command. In slot value identification, the system may function to segment or parse the query or command to identify operative terms that trigger one or more actions or operations by the system required for servicing the query or command. Accordingly, the method 200 may initially function to decompose a query or command into intelligent segments and convert each of those segments into machine-useable objects or operations. The method 200 may then function to use the slot value identifications and slot value extractions to generate one or more handlers (e.g., computer-executable tasks) for the user input data that indicate all the computer tasks that should be performed by the artificially intelligent virtual assistant to provide a response to the user query or user command.

2.1 Natural Language Processing Using Machine Learning

S210, which includes collecting user input data, functions to receive user input data in any form. The user input data may include input that originates with or is provided by a user accessing, at least, part of a system (e.g., system 100) implementing the method 200. The user input data may include, but is not limited to, speech or utterance input, textual input, gesture input, touch input, image input, and/or any suitable or type of input. Preferably, the user input data comprises one of (or a combination of) an utterance input and a textual input. Additionally, the user input data preferably includes a query by the user or a command from the user.

In the case that the user input data comprises textual input, S210 may function to direct the textual input directly to a natural language processing engine of a system implementing the method 200. That is, without pre-processing the textual input, the method 200 may function to initialize a natural language comprehension process to enable the system implementing the method 200 to understand the intent of the textual input from the user.

Additionally, or alternatively, in the case that the user input data comprises utterance and/or speech input data, optionally S215, which includes processing utterance data of the user input data, functions to convert verbally communicated user input data to textual input data. Accordingly, S215 may function to implementing an automatic speech recognition system to which a system implementing the method 200 directs some or all utterance or speech input for processing. The automatic speech recognition system may function to collect the utterance or speech input, convert the utterance or speech input to textual input, and route the converted textual input to a natural language processing system. In such case, the system implementing the method 200 or the automatic speech recognition system may function to (simultaneously) transmit a copy of the converted textual input to each of a classification engine and a slot value identification engine.

In a preferred embodiment, the method 200 may function to receive the user input data via a user interface accessible to or provided to the user. The user interface receiving the user input data may be implemented via any suitable computing device and/or form, including but not limited to, via a mobile computing device, via a web browser (having a website displayed therein), via a social network interface, via an automated teller machine, kiosk, wearable computing devices (e.g., smart watches, smart glasses, etc.), virtual and/or personal assistant devices (e.g., Alexa, Amazon Echo, Google Home, Cortana, Jarvis, etc.), and any system having a suitable user interface for implementing the method 200.

Additionally, or alternatively, the user interface may function to generate one or more graphical user interface objects that enable a user to interact with an artificially intelligent virtual assistant of a system implementing the method 200. For example, the user interface may function to generate, via a mobile computing device or desktop computing device, an animated graphical interface object that may be capable of conversantly or textually interacting with a user. Additionally, or alternatively, the user interface may function to generate one or more input boxes, such as text input boxes, into which a user may freely enter textual input data.

S220, which includes identifying a competency classification based on the user input data, functions to implement a trained machine learning model that functions to identify a classification label based on an input of the user input data. The trained machine learning model may be implemented using a deep machine learning algorithm that was trained with user input data samples from one or more data sources including crowdsourced data. In a preferred embodiment, the trained machine learning model may be specifically trained to identify one or more broad or coarse areas of competency that are invoked by the user input data.

In a first implementation, the trained machine learning model may include a single deep machine learning model that is trained to identify multiple areas of competency based on user input data and provide competency classification labels, accordingly. That is, the trained machine learning model may function to ingest the user input data and generate a suggestion and/or prediction of a competency classification label that matches at least one of the multiple areas of competency for the user input data. Each of the multiple areas of competency preferably corresponds to a distinct area of aptitude of an artificially intelligent virtual assistant. Accordingly, the artificially intelligent virtual assistant may be apt or competent to respond to queries or perform one or more tasks or commands according to the queries and/or commands identified in user input data. Therefore, a competency as referred to herein preferably relates to a subject area of comprehension or aptitude of the artificially intelligent virtual assistant for which the artificially intelligent virtual assistant can interact with or provide a response (including completing tasks) to a user input of text or speech.

According to this first implementation, user input data, preferably in the form of textual data, may be passed to the competency classification machine learning model. At the competency classification machine learning model, S220 may function to evaluate the user input data using one or more predetermined algorithms that preferably includes a deep classification machine learning algorithm. The deep classification machine learning algorithm may be configured with features or factors and associated weights that enable identification of classification labels within, at least, one of the multiple areas of competency.

In operation, S220 implementing the competency classification deep machine learning algorithm may function to analyze the user input data and generate a classification label. Specifically, based on the features, meaning and semantics of the words and phrases in the user input data, the competency classification deep machine learning algorithm may function to calculate and output a competency classification label having a highest probability of matching an intent of the user input data. For example, the classification machine learning model generate, based on user input data, a classification label of "Income" having a probability of intent match of "89%" for a given query or command of the user input data, as shown by way of example in FIG. 3B.

Additionally, or alternatively, the competency classification deep machine learning algorithm may function to calculate and output a competency classification based on one or more key terms and an arrangement of the terms and key terms in the user input data.

Additionally, or alternatively, S220 may function to calculate and output a competency classification for each of the multiple areas of competency of an artificially intelligent virtual assistant. In some embodiments, the deep classification machine learning model may be configured to calculate a competency classification label and probability of intent match for each of the known competencies of the artificially intelligent virtual assistant. For example, if the artificially intelligent virtual assistant is configured by a system implementing method 200 to be competent in three areas of competency including, Income competency, Balance competency, and Spending competency in the context of a user's banking, then the deep classification machine learning algorithm may generate a classification label for each of Income, Balance, and Spending.

Figure 3A:
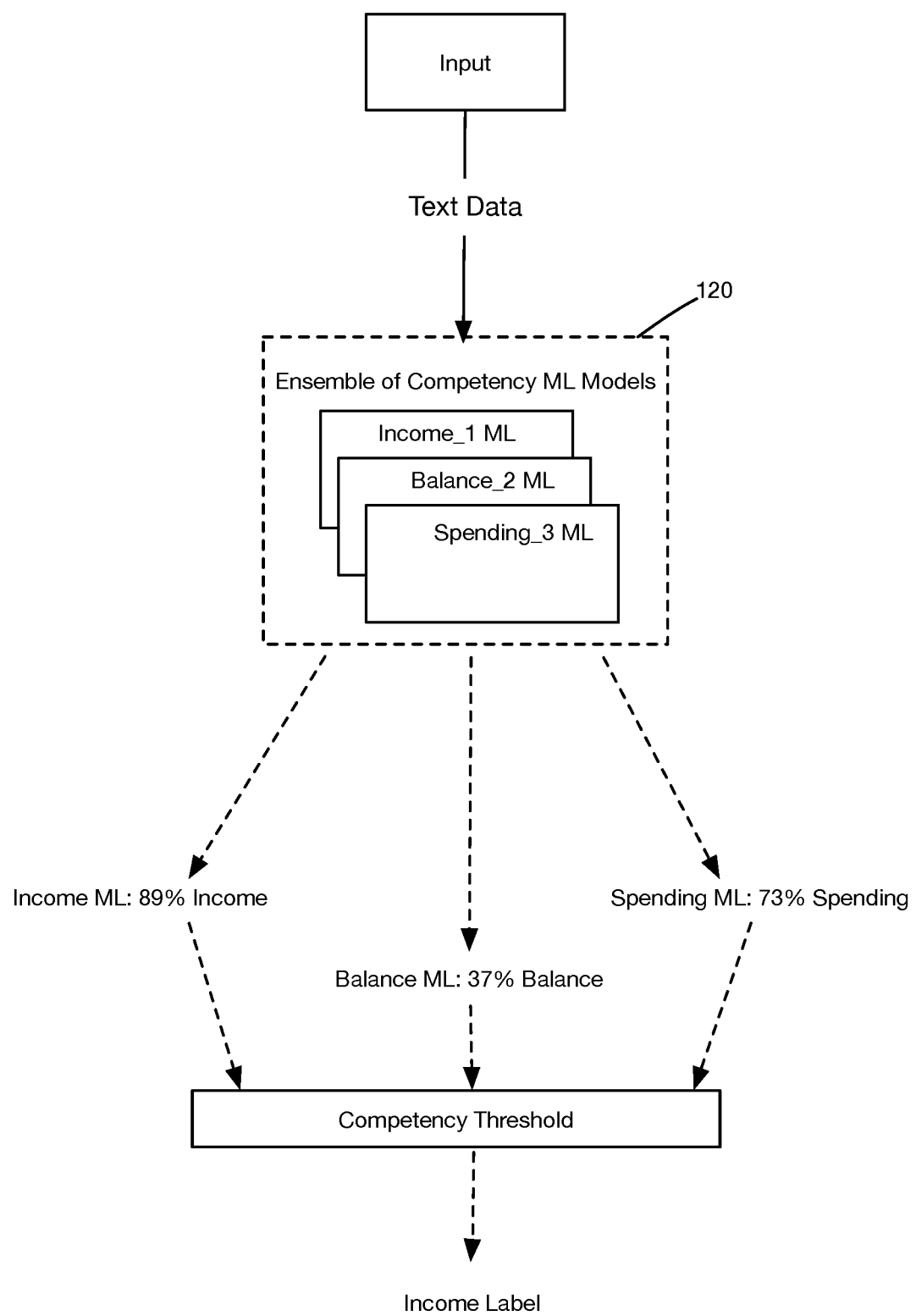
FIGS. 3A-3B illustrate example schematics for implementing portions of a method and a system in accordance with one or more embodiments of the present application.
Figure 3B:
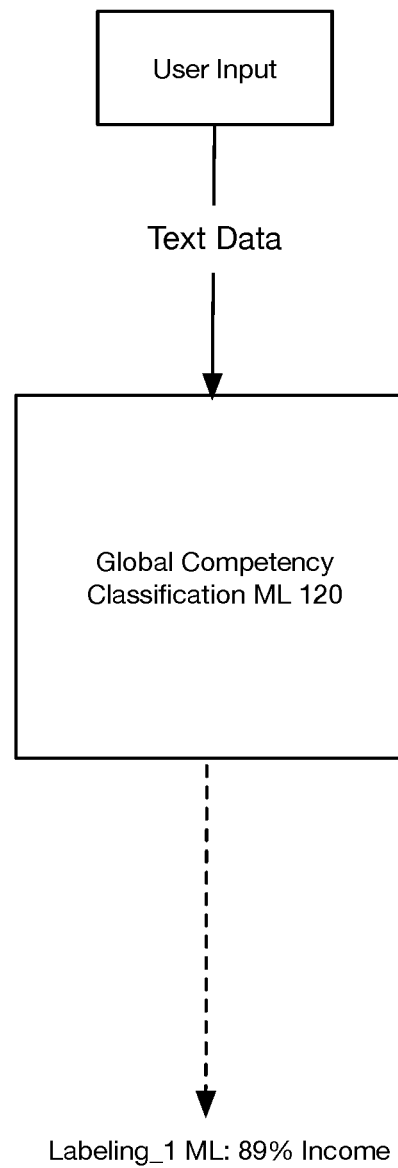

Additionally, the deep classification machine learning algorithm may calculate respective probability of intent match values of 89%, 37%, and 73%, as shown by way of example in FIG. 3A. In such example, the single deep classification machine learning algorithm may function to produce multiple, different classification labels based on the same user input data. S220 may function to output each of the respective competency classification labels and associated probability to the system implementing the method 200. Alternatively, S220 may function output only those competency classification labels satisfying or exceeding a predetermined competency classification threshold. For example, the competency classification threshold may be set at 68% probability of intent match. In such example, the competency classification threshold may function as a filter only allowing generated competency classification threshold at or above 68% to be output to the system and passed to a subsequent process (e.g., S230). Additionally, or alternatively, the competency classification model may be configured or programmed to output and pass only the competency classification label having a highest probability of intent match (e.g., Income, 89%).

S220 may function to configure the competency classification machine learning model to perform a segmented and serial classification predictions or estimations using the input user data. As described in the sections above, the competency classification model may function to use a deep classification machine learning algorithm that is capable of producing classification labels and associated probability of intents match value. In such instance, the deep learning algorithm of the competency classification model feature and weight components for each of the multiple areas of competency that enables the competency classification model to generate classification labels in each of the multiple areas of competency of an artificially intelligent virtual assistant. To enable the deep classification machine learning algorithm to generate a singular competency classification label and probability of intent match value, S220 may selectively activate only those features and associated weights of the deep classification machine learning algorithm that function to generate prediction values for a specific competency classification label (e.g., Balance competency). That is, in some embodiments, S220 selectively activates only one competency classification segment of the deep classification machine learning algorithm. In this way, the user input being analyzed, processed, and/or consumed by the deep classification machine learning algorithm generates only one competency classification label (e.g., Balance competency label) and associated probability of intent match (e.g., 37%), at a time. An operation of S220 to selectively activate and/or deactivate segments of the deep classification machine learning algorithm may be based, in some embodiments, on a pre-processing of the user input data for key terms. For instance, an instance of the key term "balance" in the user input data may cause a system implementing the method 200 to automatically activate the segment of the deep classification machine learning algorithm that functions to generate a Balance classification label and probability. Other example segments of the deep machine learning classification algorithm, such as segments for producing an Income classification label or a Spending classification label may be deactivated, made dormant, or otherwise, intentionally skipped by the system when processing the user input data. Accordingly, key terms in the user input data may trigger the selective activation and/or deactivation of segments of the deep competency classification machine learning algorithm. Additionally, or alternatively, a direct indication of a competency area may be provided by the user, which may be used by the system to selectively activate and/or deactivate segments of the deep competency classification machine learning algorithm.

It shall be noted that while specific classification labels are mentioned above (e.g., Income, Balance, Spending, etc.), these are merely examples of how the methods and systems described herein may be used. Accordingly, the systems and methods may be configured to predict or detect any type of competencies depending on a context of implementation.

In a second implementation, the trained machine learning model comprises an ensemble of specific-competency trained deep machine learning algorithms. In this second implementation, each of the specific-competency trained deep machine learning models that is trained to identify a single type of competency classification label together with an associated probability of intent match based on received user input data. This may contrast with the first implementation in which a single trained deep machine learning model functions to produce any or all the competency classification labels.

In this second implementation, S220 may provide the user input data, either synchronously (i.e., in parallel) or asynchronously, to each of the specific-competency trained deep machine learning algorithms to generate a suggestion and/or prediction of a competency classification label and associated probability of intent match, according to the training of the specific-competency algorithm that matches at least one of the multiple areas of competency for the user input data. In this implementation, each of the specific-competency deep machine learning algorithms corresponds to one of the multiple areas of competency or aptitude of an artificially intelligent virtual assistant. In a first example, upon receiving user input data, S220 may pass the user input data (or copies thereof), in a synchronous fashion, to each of three specific-competency deep machine learning algorithms, which include: a first competency machine learning (ML) for classifying user input data related to Income, a second competency ML for classifying user input data related to Balance, a third competency ML for classifying user input data related to Spending. In such example, each specific-competency algorithm may function to process the user input data and generate the classification label along with a probability of intent match value: e.g., Income ML: 89% Income, Balance ML: 37% Balance, and Spending ML: 73% Spending.

Like the first implementation, each of the competency classifications and associated probability of intent match values may be output to the system implementing the method 200. Additionally, or alternatively, S220 may function to apply a predetermined competency threshold to each of the outputs of the specific-competency machine learning algorithms to filter the results, accordingly. Depending on a setting of the predetermined competency threshold, one or more of the competency classification labels may pass to a subsequent process (e.g., S230 or the like). Additionally, or alternatively, S220 may function to select the competency classification output having the highest probability of intent match value.

It shall be noted that the probability of intent match value generated by the competency classification models may be represented as a quantitative, qualitative, and/or any suitable value or expression. As an example, a competency classification model may output a qualitative expression of a probability of intent match, such as "High", "Intermediate", or "Low" and the like. Additionally, the probability of intent match value may be expressed in any suitable range, such as for example, "A, B, C through F", "0%-% 100", "Low to High", etc.

It shall be noted that the predetermined competency threshold may be based on a statistical analysis of historical user input data and/or training user input data used to trained the competency classification machine learning algorithms. Accordingly, the predetermined competency threshold may represent, in some embodiments, a minimum level of confidence or level of accuracy of a potential classification label. As mentioned in passing, the predetermined competency threshold, in some instances, may applied such that multiple classification labels may be filtered to a next process. In those circumstances, it is possible that the user input data includes multiple queries and/or commands that contain more than one topic or area of competency (e.g., Income and Balance, or Balance and Spending, etc.). Thus, implementing a predetermined competency or confidence threshold enables the identification of queries or commands having ambiguous user input or having more than one topic of interest to the user.

S230, which includes identifying slot labels for each of the identified slots of the user input data, functions to identify a slot label having a high probability of matching a description of the data elements within a slot of the user input data. Specifically, identifying slot label preferably includes identifying a slot classification label generated using a slot classification machine learning model. Additionally, or alternatively, S230 may function to tag or augment one or more of the data elements of the user input data with a slot classification label that may generally identify or implicate a predefined categorization of a data element or a combination of data elements within the user input data. The data elements of the user input data may typically relate to each term, character or group of characters, object, clip of an utterance, or some defined segment of the user input data. For example, a user may provide as text input into a system implementing the method 200, the query: "what is my balance today"; in such example, each of the terms "what", "is", "my", "balance", and "today" may be considered data elements of the user input data.

Figure 4:
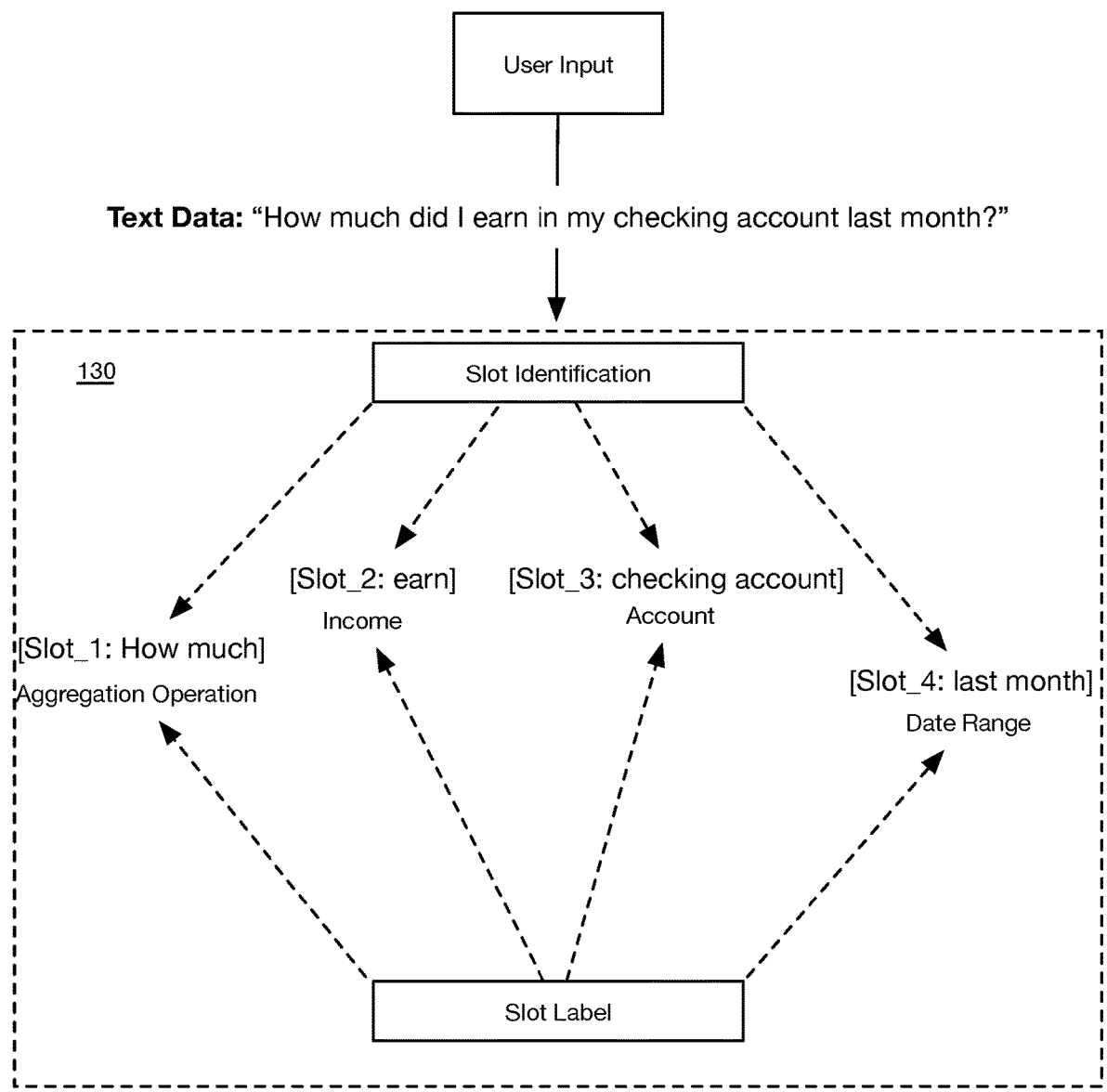
FIG. 4 illustrates an example schematic for implementing portions of a method and a system in accordance with one or more embodiments of the present application.

In some embodiments, S230 functions to partition/parse each of or a combination of the data elements of user input data into respective slots, as shown in FIG. 4. Accordingly, S230 may function to use the slot classification machine learning model to initially partition the user input data into segments or slots. Once the data elements are slotted, S230 may function to estimate a slot classification label for each of the segments of the user input data. In the ensuing example, user data input may include the query: "How much did I earn in my checking account last month?" In this example, S230 may first function to segment the user input data into slots, such as "[How much] did I [earn] in my [checking account] [last month]?" As demonstrated by this example, the parsing or segmentation of the user input data may be limited to data elements that the slot classification model or the like identifies as operative or key terms within the user data input. Any non-operative data elements or terms, such as "did I" or "in my" may simply be ignored and/or removed from the user input data to form a subset of user input data only including the segmented portions with operative data elements. Using the slot classification machine learning model, S230 may function to prescribe a slot classification label to each of the slots or segments identified by the data elements that are positioned between brackets. Example slot classification labels for each of these segments may include, [How much]: Amount; [earn]: Income; [checking account]: Account; and [last month]: Date Range. A system implementing the method 200 may additionally enumerate (e.g., slot 1, slot 2 . . . slot N) each identified slot in the order that the slots appear in a user data input string.

As mentioned above, the slot classification machine learning model may be trained to identify any type and an unlimited number of slot classification labels or values for identified slots. Because the typical constraints of a rules-based approach do not apply to the slot classification machine learning model, the slot classification model may be extended to include predetermined and emerging labels. Accordingly, a technical benefit of employing the slot classification machine learning model includes an inherent flexibility of the machine learning model to extend its slot classification labeling base to include emerging slot classification labels (including those not previously known during pre-deployment training the model).

The slot classification machine learning model may be implemented by a single machine learning algorithm or an ensemble of machine learning algorithms that function to generate one or more slot classification labels for user input data. In a preferred embodiment, the slot classification machine learning model may be trained using data samples comprising sample user queries or sample user commands that may be partitioned in a predefined manner and may be augmented with predetermined slot classification labels. Specifically, each partition of the sample user queries or sample user commands may be partitioned into ideal segments, in advance, thereby allowing the slot classification machine learning algorithm(s) to discern and/or learn user input partition schemes as well as slot value classification methods. Accordingly, the slot classification machine learning model is preferably configured for partitioning tokens of the user input data into differently labeled regions thereby identifying a value and/or meaning (or computer-comprehensible meaning) of each of the partitioned tokens of the user input data.

In a first implementation, the slot classification model may be implemented via a singly trained slot classification machine learning algorithm. The single slot classification machine learning algorithm may be a comprehensive algorithm capable of learning to classify an unlimited number slot classification labels.

In operation, the comprehensive slot classification machine learning algorithm may function to estimate or generate one or multiple slot classifications for each identified slot in user input data. For example, an identified slot segment of [how much] may trigger the prescription of, at least, two slot classification labels of Balance and Amount. In some embodiments, the system implementing the method 200 may function to adopt only one slot classification for a given slot of user input data. In such embodiments, the system may rely on a confidence value or an accuracy probability value indicating a likelihood that the slot segment relates to the assigned slot classification value. Thus, in some embodiments, the comprehensive slot classification machine learning algorithm may also function to generate a confidence value (e.g., 72%) or probability indicating a likelihood that the segment relates to the one or more slot classification labels prescribed to a slot of user input data.

In this first implementation, to discern a slot classification label when multiple slot classification labels are prescribed for an identified slot of user input data, S230 may function to apply a predetermined slot classification threshold to the multiple slot classification labels for the identified slot of user input data. In this way, S230 may filter only those slot classification labels with high confidence or probability values. Accordingly, the slot classification threshold may be some predetermined value, such as a minimum confidence or probability value or any suitable statistical value that may be used by a system implementing the method 200 to filter slot classification labels. Additionally, or alternatively, S230 may function to select the slot classification label having a highest confidence or probability value. Additionally, or alternatively, S230 may function to select and use the slot classification label having a highest confidence or probability value in a primary process of an artificially intelligent assistant and select and use one or more slot classification labels having relatively lower confidence or probability values for secondary processes of an artificially intelligent virtual assistant. The primary processes, in such embodiments, may include processes for generating a response to the user input data based at least in part on the slot classification label having the highest confidence value. The secondary processes, in such embodiments, may include processes for generating a secondary or backup response to the user input data based at least in part on the one or more slot classification labels having the relatively lower confidence values.

In a second implementation, S230 may implement an ensemble of slot classification machine learning models that function to generate slot classification labels for user input data. In this implementation, the ensemble of slot classification machine learning models may include multiple, distinct slot classification algorithms (sub-models) that each function to estimate a different or different sets of slot classification labels for user input data. In operation, each of the multiple, distinct slot classification algorithms may receive as input a copy of the user input data or the segmented user input data (i.e., with the slot components of the user input data being previously identified). Each of the multiple, distinct slot classification algorithms may function to analyze and process the user input data and potentially generate their own slot classification labels for specific slots of the user input data. For instance, in some embodiments, a first distinct slot classification algorithm may function only to predict an "Account" classification label when data elements within a slot potentially include a reference to an account (e.g., checking, savings, etc.). In such embodiment, a second distinct slot classification algorithm may function only to predict an "Date Range" classification label when data elements within a slot potentially include a reference to a date (e.g., last month).

While many of the multiple, distinct slot classification algorithms may function to generate slot classification labels for the user input data, S230 may function to automatically filter those generated slot classification labels with confidence or probability values (e.g., probability of description match) that do not satisfy a predetermined slot classification threshold. Accordingly, the multiple, distinct slot classification algorithms may generate hundreds or thousands of slot classification labels for a given user input data, but only a few (e.g., 2-3) labels may be output to a system implementing the method 200 for further processing and or use.

In a third implementation, the competency classification machine learning model described in S220 may function to work in conjunction with or synchronously with the slot classification machine learning model described in S230 to determine one or more slot classification labels for user input data. In this third implementation, the slot classification model may be a companion model to the competency classification model. In this regard, prior to identifying slot classification labels for the user input data, the slot classification model may function to receive a competency classification label for the user input data either directly or indirectly from the competency classification model.

S230, preferably implementing the slot classification machine learning model, functions to use the identified competency classification label to identify slot classification labels for the user input data. In this third implementation, the competency classification label may function to define a scope or universe of slot classification labels that may be applied to the user input data. That is, in some embodiments, the provisioning of the competency classification label to the slot classification model filters or limits a number of slot classification labels available to the slot classification model during an analysis and processing of the user input data. Thus, only a subset or a portion of the total number of possible slot classification labels may be used as labels to the slots of the user input data.

In a variation of this third implementation, the competency classification label provided by the competency classification machine learning model may be used at the slot classification machine learning algorithm as an activator or deactivator of slot classification capabilities of the slot classification model. In some embodiments, when the slot classification machine learning model comprises a single, comprehensive slot classification machine learning algorithm, S230 may function to selectively activate or deactivate features or factors of the slot classification algorithm. Accordingly, S230 may function to activate features or factors of the slot classification algorithm that are relevant to the competency classification label or alternatively, simply deactivate those features or factors of the slot classification algorithm that are not relevant (or should not be operational for) to the provided competency classification label.

Yet still with respect to this variation of the third implementation, if the slot classification machine learning model comprises an ensemble of distinct slot classification machine learning algorithms, S230 may function to selectively activate or selectively deactivate individual distinct slot classification algorithms such that only a subset or the relevant distinct slot classification algorithms of the ensemble may be used to identify slot classification labels of user input data.

Figure 5:
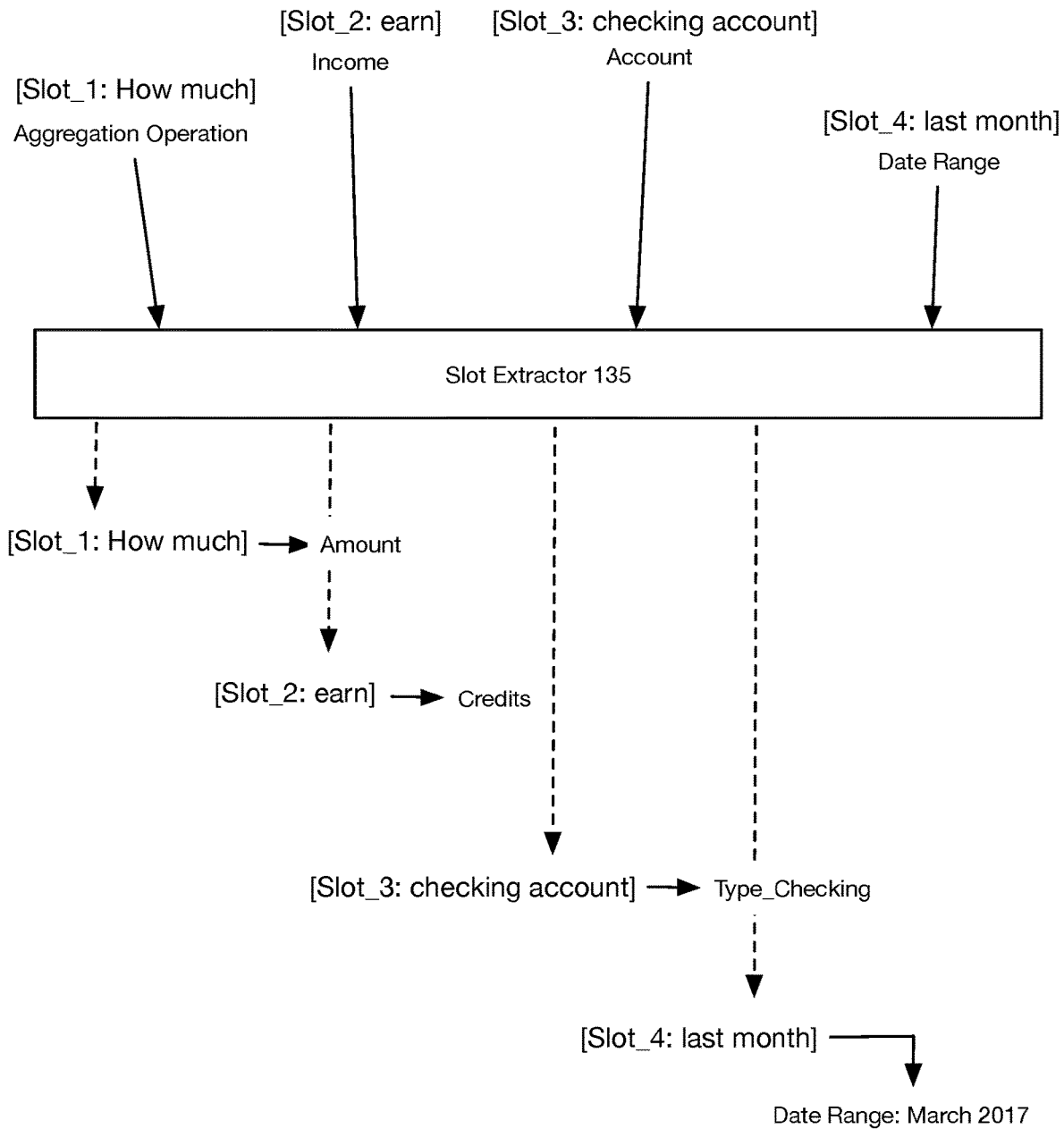
FIG. 5 illustrates an example schematic for implementing portions of a method and system in accordance with one or more embodiments of the present application.

S240, which includes collecting slot data and associated slot classification labels of user input data, functions to generate slot values by converting or mapping the slot data for a given slot of user input data and the one or more slot classification labels assigned to the slot to a machine and/or program-comprehensible object or operation, as shown in FIG. 5. Preferably, once the slot classification machine learning model at S230 identifies a slot of user input data and provides an associated slot classification label, the slot classification machine learning model may function to pass the slot and slot classification label data together as slot and slot data packet to a slot extractor. As mentioned above, the slot extractor, in some embodiments, may be an independent service from the slot classification machine learning model and that functions to generate one or more program-comprehensible objects or values from the slot and slot data passed from the slot classification model. Alternatively, the slot extractor may be a sub-component of a slot classification system that implements both the slot classification machine learning model and the slot extractor.

In a first implementation, S240 may function to implement or use a predetermined reference table to identify or determine a machine and/or program-comprehensible object or operation to map to each slot and associated one or more slot classification labels of the user input data. In such implementation, S240 implementing the slot extractor functions to match (or compare) the slot (value or data) and the associated slot classification label(s) to the predetermined reference table to identify the program-comprehensible object or operation that should be mapped to the slot and the associated slot classification label. In the example user input data: "How much did I earn in my checking account last month?", a system implementing the method 200 may identify each [How much did I earn], [checking account], and [last month] as meaningful slots. Further, the system using the slot classification model may assign the slot labels of Income, Account, and Date Range to the slots, respectively. The slots and slot labels of [How much did I earn]—Income, [checking account]—Account, and [last month]—Date Range may be passed to the slot extractor, which functions to map each of these slots and slot labels to slot extraction value (e.g., a machine and/or program-comprehensible object, value, or operation). When comparing the slot and slot label against the predetermined reference table, S240 may identify [How much did I earn]—Income to an aggregation operation (or other arithmetic function), [checking account]—Account to program-comprehensible terms of TYPE_CHECKING, and [last month]—Date Range may be converted to an actual date or time, such as "March 2017". These slot extraction values may be used in one or more subsequent systems and processes of the method 200 to perform one or more actions against the query or command, a dataset, a disparate computing system, and the like.

In a second implementation, S240 may function to implement or use predetermined rules to identify or determine a machine and/or program-comprehensible object or operation to map to each slot and associated one or more slot classification labels of the user input data. Specifically, the predetermined rules may relate to one or more policies or instructions that indicate to a manner in which a slot and slot label pair should be converted or a manner in which a slot and slot label pair should be mapped to one or more known or existing program-comprehensible objects. For instance, one of the predetermined rules may instruct that when a slot of user input data includes the terms "How much did I earn" (or some variation thereof) and is assigned a slot label of Income, that the slot and slot label should be mapped or digitally linked to an aggregation operation. In such example, the aggregation operation may be used to sum together (i.e., aggregate) several credits to a user's account or the like over a set period (e.g., last month).

Additionally, or alternatively, S240 may function to identify or determine a machine and/or program-comprehensible object or operation to map to each slot and associated one or more slot classification labels of the user input data using sophisticated regular expressions (regex), grammars, arbitrary code/functions, finite automata, and the like.

In a third implementation, S240 may function to implement or use a trained slot extraction machine learning model to identify or determine a machine and/or program-comprehensible object or operation to map to each slot and associated one or more slot classification labels of the user input data. The slot extraction machine learning model may function to receive as input the slot of the user input data and the associated slot label and output a recommend program-comprehensible object or operation to which the slot and slot label should be paired to or to which the slot and slot label pair should be converted before being passed to a subsequent process of the method 200.

It shall be noted that any combination of the above-noted implementations may be implemented by the method 200 to identify or determine a machine and/or program-comprehensible object or operation to map to each slot and associated one or more slot classification labels of the user input data.

2.2 Artificially Intelligent Response Generation for an AI Virtual Assistant

S250, which includes configuring and executing one or more computer-executable operations for generating a response, functions to collect output values of the natural language processing of the user input data in steps S210-S240 and uses the output values, as input, to generate one or more subroutines (i.e., handlers) for handling or performing one or more tasks according to the input.

In a preferred embodiment, S210 may function to pass to S250 the competency classification label for the user input data identified by the competency classification machine learning model. In such embodiment, S250 may function to use the competency classification label to define a universe of functions deployable under the competency classification label. Thus, in some embodiments, S250 functions to use the competency classification label to identify and/or select a set of available competency-specific functions from among multiple disparate sets of competency specific functions that may be applied or executed in a response generation process of S250. In such embodiment, a system implementing the method 200 may employ a set of competency-specific functions for each of the multiple competency labels. Each set of competency-specific functions includes a plurality of different functions, filters (e.g., data filters), and operations (e.g., aggregation operations, data fetching, graphics generation, response generation, etc.) that may be applied to datasets and the like when generating a response to a user query or a user command (e.g., user input data) that may be addressable under an identify competency of an artificially intelligent virtual assistant. For example, if a user query relates to an Income competency of the AI virtual assistant and is labeled as such by the competency classification model, S250 may function to select or link a response generator to the set Income competency-specific functions (bucket) when generating the AI virtual assistant's response to the user query. In this example, the Income competency-specific functions may include functions that enable fetching of financial data of the user and operations that enable summation or aggregation of portions of the financial data of the user. In another example, if a user query (e.g., "where am I?") relates to a Location competency of the AI virtual assistant, S250 may function to select a set of Location competency-specific functions when generating a response to the query. The location competency-specific function may include functions for fetching location data of the user (e.g., GPS data of user mobile device, etc.) and operations to generate a map of an area surrounding the user's location.

Figure 6A:
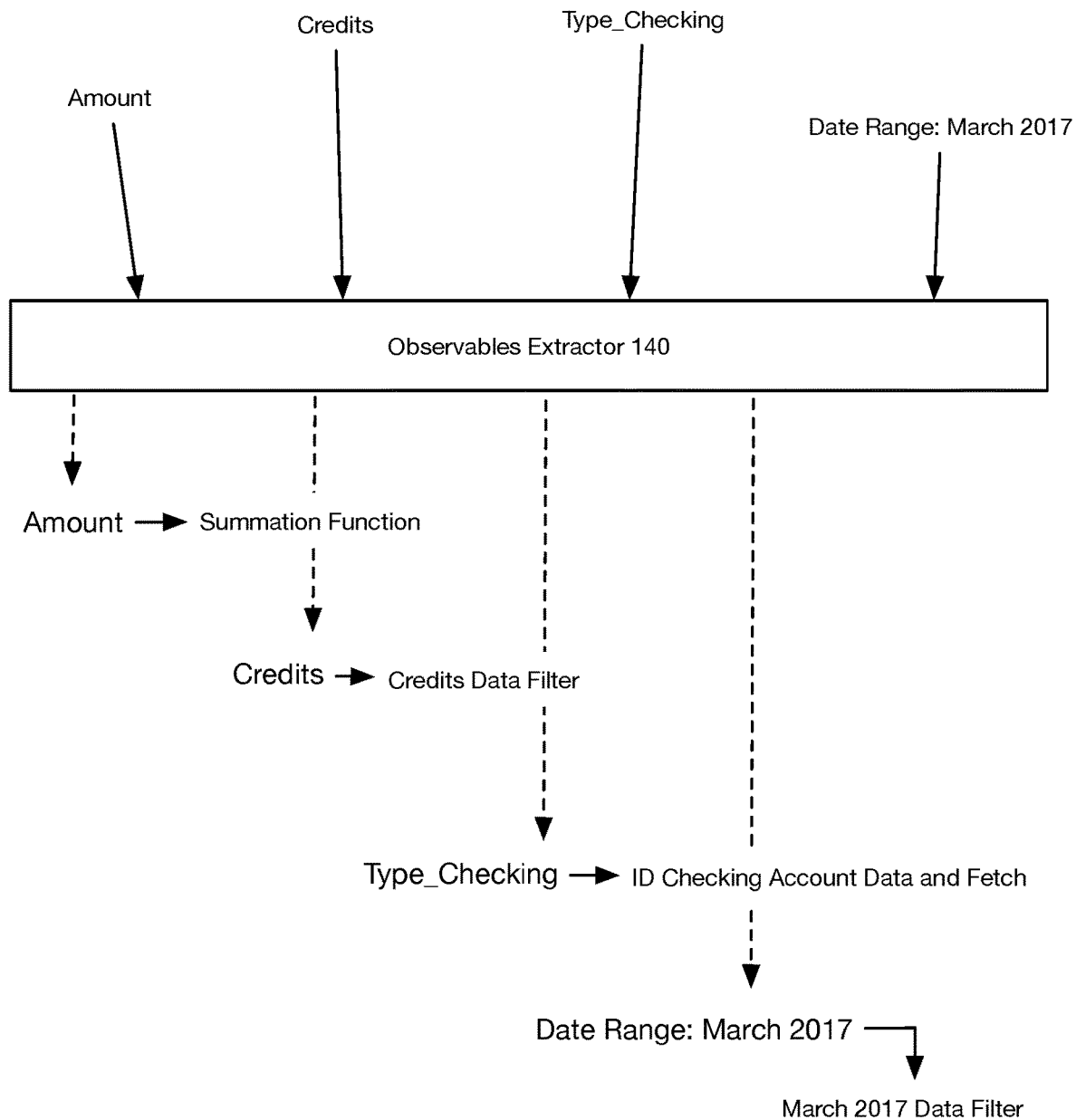
FIGS. 6A-6B illustrate an example schematic for implementing portions of a method and system in accordance with one or more embodiments of the present application.
Figure 6B:
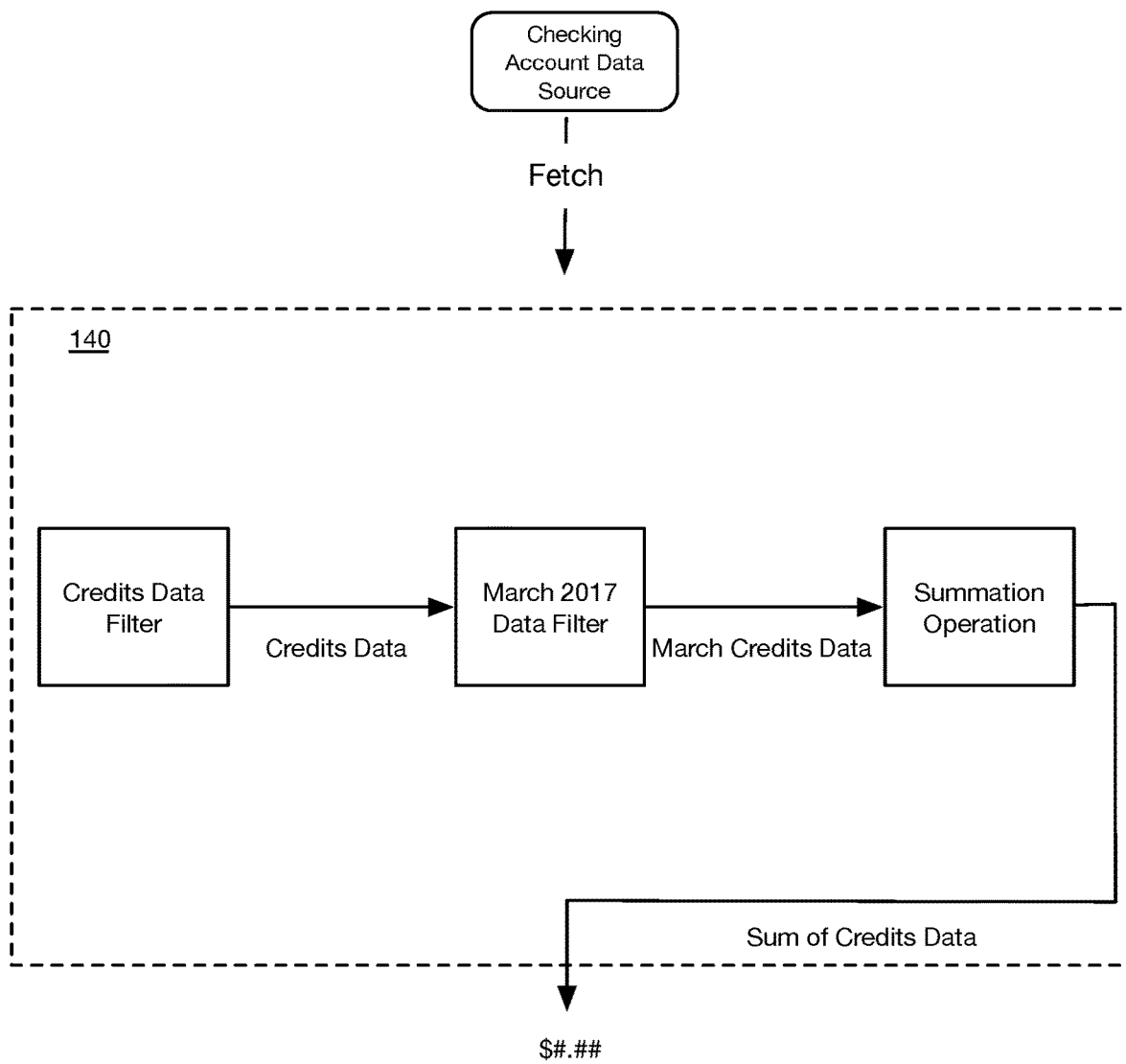

Additionally, S250 functions to use the slot values comprising the one or more program-comprehensible objects generated at S240 to determine or generate the one or more handlers or subroutines for handling or responding to the user query or user command of the user input data, as shown in FIGS. 6A-6B. Accordingly, S250 may function to use the slot values provided by S240 and/or the competency labels provided by S220 to determine one or more data sources relevant to and for addressing the user input data and one or more filters and functions or operations to apply to data accessed or collected from the one or more data sources. Thus, the coding of the slots perform by S240 to program-comprehensible objects or values may be used to specifically identify the data sources and/or the one or more filters and operations for processing the data collected from the data sources.

In a first example, S250 slot data, such as [checking account] coded or provided with the slot value of TYPE_CHECKING (e.g., [checking account]→ACCOUNT→TYPE_CHECKING, where ACCOUNT is the slot label and TYPE_CHECKING is the slot value derived from the text data in the slot and the slot label). The slot value of TYPE_CHECKING, in this example, may be used by S250 to generate a handler that functions to identify and/or select a data source comprising checking account data of the user. The checking account data may include the user's transaction data over some period. An additional handler may be generated by S250 that functions to fetch the checking account data including the transaction data from the identified data source.

Further with respect to this first example, additional slot data from the user input data, such as [last month] may be collected by S250 that may be coded by S240 with a slot value of DATETIME ("March 2017"). S250 may function to use the slot value of DATELINE ("March 2017") to generate a handler that is configured to perform a filtering operation against data values. Specifically, the filtering operations, as applied to the fetched transaction data from the user's checking account, functions to filter or extract only transaction data occurring in the month of March in the year of 2017 as useful data required for responding to the user query.

Further slot data of the user query of [How much] and [earn] may be collected by S250 wherein the slot data may be coded with the slot value of AGGREGATION or SUMMATION and the slot value of INCOME, respectively. S250 may function to use the slot value of AGGREGATION or SUMMATION to generate a first handler that functions to aggregate data values and a second handler that functions to aggregate only incoming data values. With respect to the above example, S250 using the aggregation handler may function to sum the values of the incoming transaction data collected from the user's checking account to arrive at a summed value potentially representing the sum of all the credit transactions to the user's checking account.

Additionally, or alternatively, S250 may function to provide a serial order (e.g., stacking) to the multiple handlers generated for a specific user query or command. Generating the serial order for the multiple handlers may be based on one or more predetermined rules that govern a specific order for specific combinations and types of handlers. For instance, S250 may function to stack, in execution order, each of the handlers generated for the above-noted example in the following manner: [1] data source ID handler, [2] data fetch handler, [3] data dateline filter handler, [4] data income filter handler, and [5] data aggregation handler. Accordingly, S250 may define a handler operation string that dictates a required order of executing the handlers generated for a specific user query or command. It shall be noted that in some instances various handlers may be executed synchronously, in which interdependence exist between handlers, and in other instances, some or all handlers may be executed asynchronously (in parallel) where there is limited or no interdependence between the handlers. It shall also be noted that the serial order of the multiple handlers functions to enable a proper order of applying the handlers to fetched data for the purpose of identifying an accurate response or generating accurate response data to the user query and/or user command.

It shall also be noted that while, in the above example and description, S250 functions to generate handlers specifically generated for handling a user query relating to a monthly earning, the functionality of S250 should not be limited to such specific example. S250 may function to generate any type or variety of handlers required for handling any type of user query or user command that a system (AI virtual assistant) implementing the method 200 has competency. For instance, S250 may function to generate handlers for creating user interface graphics, response data, graphics, and/or media based on the handlers processed by S250.

S260, which includes generating a response, functions to collect and use outputs derived in steps S210-S250 to provide a response to a user query or a user command of the user input data.

In one implementation, S260 may function to implement a response generator that may function to use the competency classification label of the user input data to identify or select one predetermined response template or one of a plurality of predetermined response templates. For each competency classification label, the system implementing the method 200 may implement or have stored a plurality of response templates that may be selected by the response generator implemented by S260 based on an identified competency classification label for user input data. Additionally, or alternatively, the response template may be selected based on both the competency classification label and one or more generated slot values. In such instance, the one or more slot values may function to narrow the pool of response template selectable by the response generator to a subset of a larger pool of response templates to take into account the variations in a query or user command identified in the slot values. The response templates may generally a combination of predetermined output language or text and one or more input slots for interleaving the handler outputs determined at S250.

In second implementation, S260 implementing a response generator may function to use a combination of the competency classification label and the slot values of the user input data to generate a custom response to the user query or user command of the user input data. In such implementation, S260 may implement one or more predetermined rules that govern response construction based on the competency classification label and the slot values of the user data. In some embodiments, the predetermined rules may be based on user preferences input provided by the user. Thus, the competency classification label and the slot values of the user data may be used by S260 to select (or activate/deactivate) predetermined rules for response construction. By executing the predetermined rules and providing the handler output data from S250, S260 may function to generate a customer response tailored to the user and the query or the command of the user.

In a third implementation, S260 implementing a response generator may function to one or more segments of the query or command of the user input data to prefill or populate a response template (or form). For instance, S260 may function to identify relevant slot data that may be recycled into one or more sections of a response template. In such instance, the response template may be configured with one or more sections for receiving slot data from the user input data. Accordingly, the response template may include one or more slot sections with each slot section having an associated slot label. Thus, for a given user input data in which the slots have been identified and slot labels assigned thereto, the response template may function to automatically pull slot data of the user input data into its one or more slot sections based on the slot label associated with the slot data.

The system and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Although omitted for conciseness, the preferred embodiments include every combination and permutation of the implementations of the systems and methods described herein.

As a person skilled in the art will recognize from the previous detailed description and from the figures and claims, modifications and changes can be made to the preferred embodiments of the invention without departing from the scope of this invention defined in the following claims.

What is claimed:

1. A computer-implemented conversational response system comprising:
   a machine learning-based platform implemented by one or more computers over the web that implements:
   a competency classification system comprising a plurality of distinct competency classification machine learning classifiers,
   wherein:
   responsive to user input data comprising text representation of a user utterance, each of the plurality of distinct competency classification machine learning classifiers outputs a distinct one of a plurality of distinct competency classification labels and a level of confidence for each distinct one of the plurality of distinct competency classification labels;
   the competency classification system:
   outputs a single distinct competency classification label of the plurality of distinct competency classification labels based on the level of confidence associated with the single distinct competency classification label satisfying a competency classification threshold;
   calculates a probability value for the single distinct competency classification label;
   a slot identification system that partitions the text representation of the user input data into a plurality of distinct segments of text;
   a slot classification system comprising multiple, distinct slot classification recurrent neural networks, wherein:
   (i) each of the multiple, distinct slot classification recurrent neural networks is trained, via a supervised training or an unsupervised training, to predict one or more distinct slot classification labels for distinct segments of text data;

(ii) each of the one or more distinct slot classification labels identifies a predefined categorization of each of the plurality of distinct segments of text;

(iii) the slot classification system selectively activates one slot classification recurrent neural network of the multiple, distinct slot classification recurrent neural networks based on receiving the single distinct competency classification label from the competency classification system;

(iv) based on an input of the plurality of distinct segments of text, the selected one slot classification recurrent neural network:

(a) estimates one or more distinct slot classification labels for each of the plurality of distinct segments of text;

(b) prescribes at least one of the one or more distinct slot classification labels to each of the plurality of distinct segments by pairing the at least one of the one or more distinct slot classification labels together with each one of the plurality of distinct segments of text;

a slot extraction system that:

receives one or more distinct slot data packets from the slot classification system, each of the one or more slot data packets comprising the pairing of the at least one of the one or more distinct slot classification labels and one of the plurality of distinct segments of text;

compares one of the one or more distinct slot classification labels and the one of the plurality of distinct segments of text of each pairing to a predetermined reference table; and converts each pairing of (a-i) the at least one of the one or more distinct slot classification labels and (b-i) each one of the plurality of distinct segments of text to one of a plurality of distinct machine operations of the predetermined reference table based on the comparison of the one of the one or more distinct slot classification labels and the one of the plurality of distinct segments of text of each pairing to the predetermined reference table, wherein the predetermined reference tables includes a plurality of distinct mappings between distinct slot classification labels and the plurality of distinct machine operations;

an observables extraction system that executes each of the plurality of distinct machine operations to produce one or more distinct pieces of response data; and a response generating system that: (1) selects a response from a plurality of responses, wherein the response comprises predetermined output text and one or more input slots; and (2) inputs the one or more distinct pieces of response data into the one or more input slots of the response to the user input data.

2. The system according to claim 1, wherein the plurality of distinct machine operations includes one or more of:
converting a text to a date or a date range; and
applying an arithmetic function against a distinct dataset.

3. The system according to claim 1, wherein
the slot extraction system uses the single distinct competency classification label for the text representation of the user input data to restrict one or more distinct machine operations that can be used for building the one or more distinct pieces of response data.

4. The system according to claim 1, wherein
the plurality of distinct competency classification machine learning classifiers are trained using crowd-sourced training data samples.

5. The system according to claim 1, wherein
the competency classification threshold relates to a minimum level of confidence,
when the confidence value for the single distinct competency classification label satisfies the competency threshold, the competency classification system outputs the single distinct competency classification label.

6. The system according to claim 1, wherein
the slot classification system enumerates each of the plurality of distinct segments of text within the text representation of the user input data in an order that each of the plurality of distinct segments of appear within the text representation of the user input data.

7. The system according to claim 1, wherein:
the slot extraction system accesses the predetermined reference table that includes a plurality of distinct slot labels mapped to one or more distinct conversion operations; and
the conversion of each distinct pairing of each enumerated slot of one or more tokens and the predicted slot label for the enumerated slot, respectively, to the distinct conversion operation includes:
comparing each distinct pairing to the reference table; and
identifying a respective conversion operation for each distinct pairing based on the comparison.

8. The system according to claim 1, wherein the one or more machine operations include one or more of:
applying a filter operation against a dataset;
converting a given slot of the text representation of the user input data to a date or a date range; and
applying an arithmetic function against a distinct dataset.

9. The method according to claim 8, wherein
producing the one or more distinct pieces of response data includes executing one or more of:
the applying the filter operation against the dataset;
converting the given slot of the text representation of the user input data to the date or the data range; and
applying the arithmetic function against the distinct dataset; and
returning results of the executing as the one or more distinct pieces of response data.

10. The system according to claim 1, further comprising:
an automatic speech recognition system that:
collects and processes utterance input, and
simultaneously transmits a copy of the text representation of the user input data to each of the competency classification system and the slot classification system.

11. The system according to claim 1, wherein
each of the plurality of distinct competency classification machine learning classifiers comprises a plurality of distinct weights and associated features that are selectively activated or selectively deactivated based on the text representation of the user input data.

* * * * *